May 1, 1934.  J. RÜCKERT  1,956,810
DEVICE FOR MACHINING AND TRIMMING THE SIDE
FACES OF WEAVING SHUTTLES OR THE LIKE
Filed Feb. 2, 1933
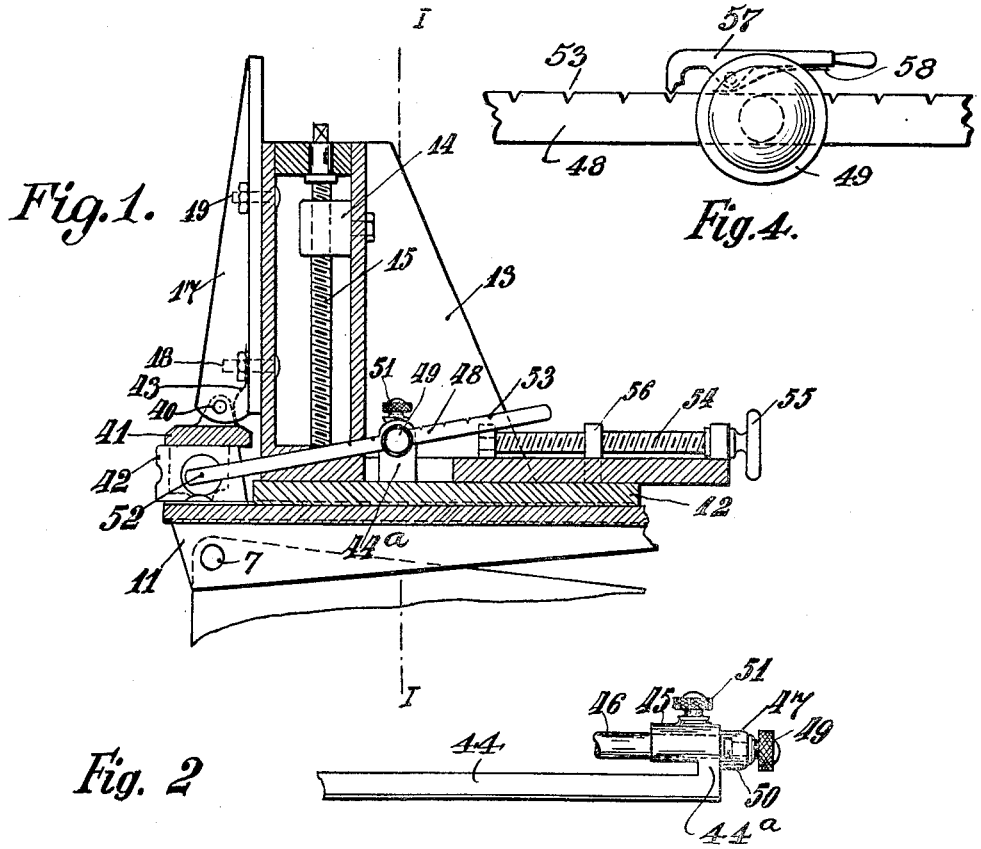

Patented May 1, 1934

1,956,810

UNITED STATES PATENT OFFICE 1,956,810

DEVICE FOR MACHINING AND TRIMMING THE SIDE FACES OF WEAVING SHUTTLES OR THE LIKE

Josef Rückert, Zuckmantel, Czechoslovakia

Application February 2, 1933, Serial No. 654,911
In Germany November 5, 1932

6 Claims. (Cl. 144—2)

This invention relates to improvements in or modification of the invention described and claimed in my prior pending application Serial Number 627,801 and has for its object to provide an improved device for trimming the side faces of weaving shuttles or the like.

In this former pending application a process for the production of shuttles for looms and for trimming the faces of used shuttles is described, in which prior to the insertion of the block or used shuttle in a chuck device the latter is adjusted with respect to the horizontal to such an angle that the face to be machined makes the desired angle with the horizontal, whilst after the block or shuttle has been inserted, the chuck device and block or shuttle are moved past the milling head, the partly machined block or shuttle then being removed from the chuck device and replaced by another, this being continued until the desired number of blocks or shuttles have been treated on one side, and then after angular adjustment the remaining sides of the articles are machined consecutively until all four sides have been treated.

For the purpose of setting and trimming used and worn shuttles, according to my former application a special auxiliary device is employed which consists of a bar arranged in the clamping device, in which the shuttles are inserted and guided by means of the latter, both ends of which are provided with slots or guides for supports in the form of angle members comprising adjustable guide spindles, nuts and slides, the supports being adapted to be secured by clamping screws or adjusting screws at any desired point along the bar. This auxiliary device makes it possible to align the axis of the shuttle even if one extremity of it lies outside the center line and thus makes it possible to work in any desired manner on all existing types of shuttles.

A disadvantage of the auxiliary device described in my former application is, however, that it forms a separate part which is not directly connected with the machine as such but is only affixed in case of need. In practice, this is rather inconvenient.

The object of my present invention is to overcome this inconvenience entirely in a simple manner. At the same time the invention makes it possible to adapt the auxiliary device to the different existing lengths of shuttles much more conveniently than hitherto and to compensate in a simple way any eccentricity of shuttle extremities which may exist. The clamping device itself is improved and at the same time the adjusting of the required circumference of working is simplified.

All these advantages are secured by the fact that the auxiliary device according to the present invention is directly connected with the machine itself and consists of one piece with the adjusting table. It is to be understood that according to this invention the auxiliary device is mounted on an adjustable plate equipped to hold and adjust worn shuttles in proper position relative to the blade or milling cutter. This differs from prior devices in which the worn shuttle is mounted on a support together with the auxiliary device, which is separate from the machine itself and wherein the adjustable mounting plate must be arranged properly relative to the machine before accurate work can be performed.

Broadly the invention consists of an auxiliary device for adjusting and trimming used and worn shuttles which is directly connected with the slidable and adjustable plate upon which supporting rods or arms are so arranged that they can be displaced and pivoted, said rods or arms being provided with indentations at their ends between which the shuttle is placed and aligned by displacing said supporting rods or arms.

In order that my invention may be more clearly understood one particular construction thereof will now be described with reference to the accompanying drawing wherein:

Fig. 1 is a cross-sectional elevation of the chuck device in which the parts of the apparatus which are not essential for the present invention are merely indicated, Fig. 2 is a front elevation of the adjusting device, Fig. 3 is a plan of the essential parts of the adjusting device, Fig. 4 is a front elevation of a detail of the adjusting device, drawn on a slightly larger scale.

Fig. 5 is a side elevation of Fig. 4.

Referring to the drawing, a supporting table 11 is pivotally connected on a horizontal axis 7 to a suitable part or frame of a milling machine (not shown), and supported on the table 11 is a slidable adjusting plate 12. As will hereinafter appear, the device for supporting and holding a shuttle in the desired position relative to the usual milling cutter or blade for enabling the latter accurately to form or trim the faces of the shuttles.

17 is the upper clamping device which, according to my former application, pivots about an axis 18 but is also provided, according to the present invention, with a lower lug member, which is the clamp jaw proper 41 and can be pivoted round an axis 40 which lies perpendicular to the axis 18. In this way is obtained practically a cardan suspension of the clamp jaw 41 which comes to lie on the piece to be worked 42, with the result that said clamp jaw 41 can follow any inclination of the upper side of the piece to be worked. In order to hold the jaw 41 generally in a given position, a spring 43 is provided which tends to bring the jaw back into a horizontal position.

By means of the described method of clamping, the piece to be worked is supported perfectly evenly on all the points of its upper edge and particularly in the zone which is nearest to the surface which has to be worked. This is of great importance because any collapsing of particular sections of the pieces to be worked, i. e. of the shuttle wall, under the pressure of the milling machine, becomes impossible. This is particularly important for the trimming of old and worn shuttles.

13 is a rear stay of the clamp console, 15 is a vertical screw-threaded spindle for lifting and lowering the clamp device 17 and 41, and 14 is the nut with which the spindle 15 co-operates, said nut being rigidly secured to the clamp console.

Mounted on the top of the plate 12 and transversely thereof is a bar 44 which is formed at each end with an upright post 44ᵃ having a tubular guide bracket 45 extending inwardly and in parallel relationship to the bar 44. Slidable in each bracket 45 is a pin or rod 46 which can be adjusted axially for any desired length of shuttle. The pins 46 are provided at their outer end with head pieces 47 which have preferably square or other suitably shaped apertures into each of which a correspondingly shaped rod or arm is slidably arranged.

The pins 46 can be clamped fast in any position by means of the thumb screws 51.

The two rods or arms 48 are provided at their ends, which slide towards the front of the machine, with indentations 52. On their upper edge these rods or arms are provided with a number of notches 53 which are spaced at equal distances from one another and arranged on both sides in exactly the same place; coacting with these notches is a latch 57 (Figs. 4 and 5) provided with a spring 58, thus ensuring an exactly parallel adjustment of the shuttle in relation to the adjusting plate 12 before the rods or arms are secured in position by means of the thumb screws 49.

On the adjusting plate 12 and connected with it in any suitable manner, is a sliding device consisting of a screw-threaded spindle 54 co-operating with a nut 56, the said sliding device is actuated by a handle 55 which, according to its direction of rotation, operates either to push the plate 12 forward or draw it back. This device is arranged on the base of the bracket in any desired way.

The adjusting and clamping device operates as follows:

The shuttle which is to be trimmed is placed between the indentations 52 formed in the rods or arms 48 arranged on both sides of the adjusting plate 12 by means of the head pieces 47, and the distance between them being adjusted by sliding the pins 46 in the guides 45 after the clamp screws 51 have been released.

The adjusting of the shuttle, which is now between the rods or arms 48 and held by them, in relation to the adjusting plate 12, is now obtained by sliding the arms or rods 48 in the apertures 50 formed in the head pieces 47 of the pins 46, after the clamp screws 49 have been released; this is effected in the following manner: if shuttles are to be worked, the pointed ends of which lie in the axes of the shuttles, then the two rods or arms are so adjusted by means of the notches 50 and the latches 57 arranged in the pin heads 47, that the distance between the indentations and the adjusting plate i. e. the pivoting point, are equal. If shuttles of the kind are to be worked in which one end is a certain distance outside the axis, then one of the two rods or arms 48 is drawn out less than the other, by an amount corresponding to that known distance. In this way a precise alignment is obtained which corresponds to the edge of the distance plate which is parallel to the axis around which the two rods or arms can be pivoted.

Once the shuttle has been aligned as described the distance plate is adjusted by means of the adjusting devices 54, 55, and 56, so that the edge of the piece to be worked protrudes at the desired distance beyond the clamp jaws, and then the shuttle is clamped between the base plate 11 and the doubly pivotable clamp plate 41, whereupon, the whole support having been placed into the milling position by means of a crank as described in my prior application, the milling can be proceeded with.

After a shuttle edge has been worked, according to my prior application, the inclination of the complete clamping device remaining preferably unaltered for the time being, while the corresponding sides of a number of other shuttles are milled. When the third side of the shuttle is milled, of which one true edge is already available, the auxiliary device is put out of action by pushing back the rods or arms, and the shuttle is rested with the already milled side directly against the adjusting plate.

Having now particuluarly described and ascertained the nature of my said invention, and in what manner the same is to be performed, I wish it to be understood that I do not desire to be limited to the exact details of construction shown and described, for obvious modifications will occur to a person skilled in the art without departing from the scope of the invention.

What I claim as new and desire to secure by Letters Patent, is:

1. In an apparatus for truing loom shuttles, a main supporting plate, a mounting for said plate affording rocking movement thereof about a horizontal axis, a plate adjustable along said main plate, means at one end of said adjustable plate for clamping one side of a shuttle to said main plate, a pair of substantially parallel shuttle-engaging arms, a mounting on said adjustable plate for each arm enabling independent lengthwise adjustment thereof and also lateral adjustment toward or away from the other arm, and means on the outer end portions of said arms for engaging opposite ends of a shuttle.

2. In an apparatus as set forth in claim 1, means on each of said arms for enabling accurate regulation of the distance between the shuttle-engaging means and said mounting for the arms in accordance with the size and shape of the shuttle to be trimmed.

3. In an apparatus as set forth in claim 1, means including a screw-threaded spindle and a nut cooperating therewith for adjusting said adjustable plate relative to said main plate.

4. In an apparatus as claimed in claim 1, in which the means for clamping one side of a shuttle comprises a clamping jaw, a bracket for said jaw, a horizontal pivotal connection between said jaw and bracket, and a pivotal mounting for said bracket arranged on an axis at right angles to the axis of said jaw thereby to enable the clamping surface of the latter to the inclination of the side of different shuttles.

5. In an apparatus as claimed in claim 1, in which the means for clamping one side of a shuttle comprises a clamping jaw, a bracket for said jaw, a horizontal pivotal connection between said jaw and bracket, a pivotal mounting for said bracket arranged on an axis at right angles to the axis of said jaw, and a spring disposed between said jaw and bracket for normally holding said jaw in horizontal position.

6. In an apparatus as claimed in claim 1, a series of equal spaced notches on each of said arms for enabling accurate regulation of the distance between the shuttle-engaging means and said mounting for the arms in accordance with the size and shape of the shuttle to be trimmed, and a spring-tensioned latch for each arm engageable in a notch for retaining the arms in adjusted position.

JOSEF RÜCKERT.